(12) United States Patent
Meyer

(10) Patent No.: US 10,391,443 B2
(45) Date of Patent: Aug. 27, 2019

(54) PROCESS AND PLANT FOR THE PURIFICATION OF RAW SYNTHESIS GAS

(71) Applicant: L'Air Liquide, Societe Anonyme pour l'Etude et l'Exploitation des Procedes Georges Claude, Paris (FR)

(72) Inventor: Manfred Meyer, Friedrichsdorf (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 152 days.

(21) Appl. No.: 15/542,835

(22) PCT Filed: Nov. 26, 2015

(86) PCT No.: PCT/EP2015/025092
§ 371 (c)(1),
(2) Date: Jul. 11, 2017

(87) PCT Pub. No.: WO2016/091393
PCT Pub. Date: Jun. 16, 2016

(65) Prior Publication Data
US 2017/0361264 A1    Dec. 21, 2017

(30) Foreign Application Priority Data

Dec. 10, 2014   (DE) ........................ 10 2014 118 345

(51) Int. Cl.
*B01D 53/14*    (2006.01)
*C01B 3/52*    (2006.01)
(Continued)

(52) U.S. Cl.
CPC ..... *B01D 53/1406* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS 8,377,403 B2 *   2/2013   Mak .................. B01D 53/1431
                                                 423/242.1
8,894,954 B2 *  11/2014   Smits ................. B01D 53/1487
                                                 252/184
(Continued)

FOREIGN PATENT DOCUMENTS

DE    10 2006 056117       5/2008

OTHER PUBLICATIONS

International Search Report and Written Opinion for PCT/EP2015/025092, dated Feb. 12, 2016.

*Primary Examiner* — Tam M Nguyen
(74) *Attorney, Agent, or Firm* — Justin K. Murray

(57) ABSTRACT

A process for the stepwise separation of accompanying gases from a raw synthesis gas stream by a liquid absorbent countercurrently guided through all process steps and circulated via regeneration plants, wherein either the accompanying gases $H_2S$, COS and $CO_2$ are separated in a common absorption step or, in one of the selective absorption steps chiefly $H_2S$ and COS are separated and in the next step in flow direction of the gas chiefly $CO_2$ is separated, and in the last step a separation of accompanying gas residues (fine wash) is effected, wherein before the separation of $H_2S$ and COS an absorption step chiefly for the separation of aromatics and subsequently an absorption step chiefly for the separation of methyl mercaptan is carried out.

18 Claims, 1 Drawing Sheet

(51) Int. Cl.
  B01D 53/18 (2006.01)
  C01B 3/02 (2006.01)
  C10J 3/02 (2006.01)
  C10K 1/00 (2006.01)

(52) U.S. Cl.
  CPC ..... B01D 53/1487 (2013.01); B01D 53/1493 (2013.01); B01D 53/185 (2013.01); C01B 3/02 (2013.01); C01B 3/52 (2013.01); C10J 3/02 (2013.01); C10K 1/002 (2013.01); C10K 1/004 (2013.01); C10K 1/005 (2013.01); B01D 2252/2021 (2013.01); B01D 2257/304 (2013.01); B01D 2257/306 (2013.01); B01D 2257/308 (2013.01); B01D 2257/408 (2013.01); B01D 2257/504 (2013.01); C01B 2203/048 (2013.01); C01B 2203/0415 (2013.01); C01B 2203/0475 (2013.01); C01B 2203/0485 (2013.01); C01B 2203/147 (2013.01); C10J 2300/093 (2013.01); Y02C 10/06 (2013.01); Y02P 20/152 (2015.11)

(56) References Cited

U.S. PATENT DOCUMENTS

| | | | |
|---|---|---|---|
| 2009/0087368 A1* | 4/2009 | Mak | B01D 53/1468 423/244.09 |
| 2012/0202897 A1 | 8/2012 | Keskinen et al. | |
| 2012/0251418 A1 | 10/2012 | Sieder et al. | |
| 2013/0053456 A1 | 2/2013 | Wahlstrom et al. | |
| 2015/0147254 A1* | 5/2015 | Weiss | B01D 53/1462 423/229 |
| 2018/0119039 A1* | 5/2018 | Tanaka | B01D 53/04 |

* cited by examiner

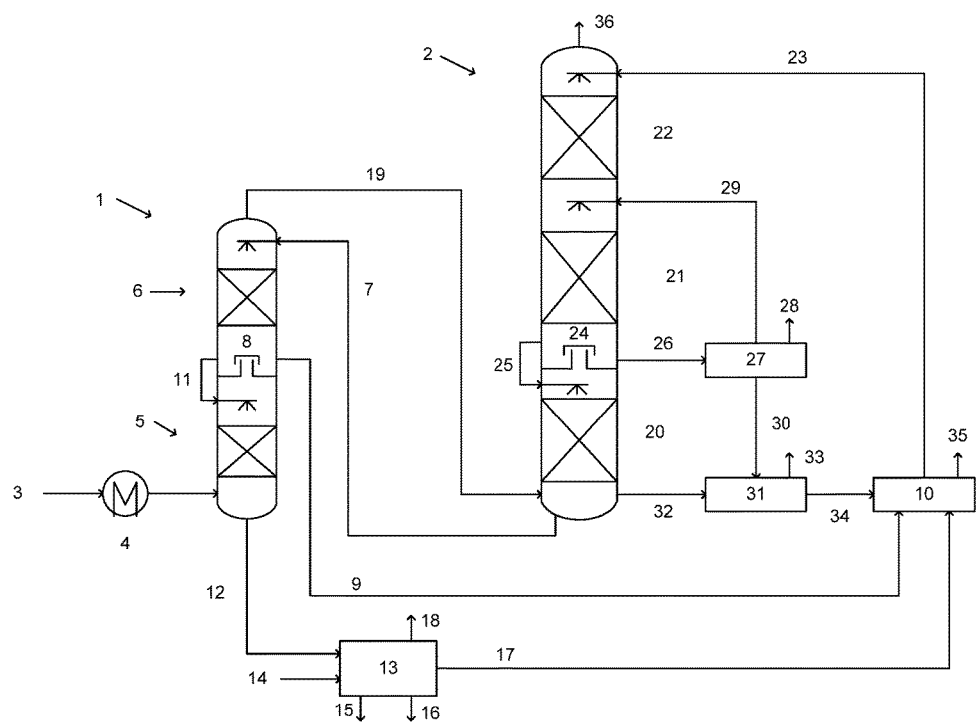

US 10,391,443 B2

PROCESS AND PLANT FOR THE PURIFICATION OF RAW SYNTHESIS GAS

CROSS REFERENCE TO RELATED APPLICATIONS

This application is a § 371 of International PCT Application PCT/EP2015/025092, filed Nov. 26, 2015, which claims the benefit of DE 10 2014 118345.2, filed Dec. 10, 2014, both of which are herein incorporated by reference in their entireties.

FIELD OF THE INVENTION

The invention relates to a process for the stepwise separation of accompanying gases from a raw synthesis gas stream by a liquid absorbent countercurrently guided through all process steps and circulated via regeneration plants, wherein in one of the absorption steps chiefly $H_2S$, COS and $CO_2$ are separated, and in the next step in flow direction of the gas a separation of accompanying gas residues (fine wash) is effected.

The invention also relates to a process for the selective and stepwise separation of accompanying gases from a raw synthesis gas stream by a liquid absorbent countercurrently guided through all process steps and circulated via regeneration plants, wherein in one of the selective absorption steps chiefly $H_2S$ and COS are separated, and in the next step in flow direction of the gas chiefly $CO_2$ is separated, and in the last step a separation of accompanying gas residues (fine wash) is effected. Furthermore, the invention also relates to a plant for carrying out this process.

BACKGROUND

Processes for the separation of undesired accompanying substances from a raw synthesis gas stream are known, such as e.g. the Rectisol process. The Rectisol process is described in principle in Ullmann's Encyclopedia of Industrial Chemistry, 6th Edition, Vol. 15, p. 399 ff. This process serves to purify raw synthesis gas chiefly consisting of CO and $H_2$, which was produced from coal or coke by the fixed-bed pressure gasification process, by absorption of the accompanying gases. The fixed-bed pressure gasification process is described in principle in Ullmann's Encyclopedia of Industrial Chemistry, 6th Edition, Vol. 15, p. 367 ff. The Rectisol process uses methanol as absorbent, utilizing the property of methanol that its absorption capacity for the accompanying substances greatly increases with decreasing temperature, while it remains virtually constant for CO and $H_2$. The undesired accompanying substances chiefly are the accompanying gases carbonyl sulfide (COS), hydrogen sulfide ($H_2S$) and carbon dioxide ($CO_2$).

In this process, the methanol used as absorbent is circulated via regeneration plants. In the regeneration plants, the loaded methanol is liberated from the absorbed gases in a physical way. In a first regeneration step $CO_2$ is removed from the loaded methanol absorbent by depressurization and/or stripping with a gas, for example nitrogen. In a second regeneration step the sulfur-containing gases, COS and $H_2S$, are expelled by heating. It is aimed to produce a $COS/H_2S$ gas largely free from $CO_2$, as its economically interesting further processing is impaired by mixing with $CO_2$.

In the Rectisol process a distinction is made between the standard and the selective Rectisol process.

In the so-called standard Rectisol process the accompanying gases $COS/H_2S$ and the $CO_2$ jointly are separated from the raw synthesis gas in one absorption step. In the so-called selective Rectisol process the sulfur-containing accompanying gases $COS/H_2S$ and the $CO_2$ each are separated from the raw synthesis gas in separate absorption steps proceeding one after the other. This selective absorption becomes possible by suitable adjustment of the process parameters, in particular the quantity ratio of absorbent and gas to be absorbed. The advantage of the selective absorption consists in that the $COS/H_2S$ gas and the $CO_2$ gas for the most part already are kept separate during the absorption and only the smaller part must be separated during the regeneration of the methanol.

Beside the above-mentioned components COS, $H_2S$ and $CO_2$ the raw synthesis gas however contains further accompanying gases. The document DE 10 2006 056 117 A1 describes a corresponding process, in which before the absorption steps for the separation of the sulfur components and the $CO_2$ a further absorption step is carried out, in order to selectively separate metal carbonyls from the synthesis gas.

The raw synthesis gas often also contains higher hydrocarbons and mercaptans, in particular methyl mercaptan, and other substances, such as aromatics, in particular benzene, $NH_3$, HCN, thiophene, other organic sulfur compounds and lighter hydrocarbons in such quantities that they lead to problems in the conventional selective Rectisol process. This is the case in particular when the raw synthesis gas has been obtained by gasification of coal, for example by the fixed-bed pressure gasification process. The problems consist in that these substances either are enriched in the absorbent and hence render it useless after a short time of use, or, especially in the case of mercaptans, that during the regeneration of the absorbent by depressurization or stripping they are expelled together with the $CO_2$ and possibly represent an odor nuisance to the environment.

SUMMARY OF THE INVENTION

It is the object of the invention to provide a process which avoids the above-described disadvantages of the prior art. This object can be solved by a process according to the various embodiments described herein.

Standard Absorption Process:

A process for the stepwise separation of accompanying gases from a raw synthesis gas stream by a liquid absorbent countercurrently guided through all process steps and circulated via regeneration plants, wherein in one of the absorption steps chiefly $H_2S$, COS and $CO_2$ are separated, and in the next step in flow direction of the gas a separation of accompanying gas residues (fine wash) is effected, characterized in that before the separation of $H_2S$, COS and $CO_2$ an absorption step chiefly for the separation of aromatics and subsequently an absorption step chiefly for the separation of methyl mercaptan is carried out.

Selective Absorption Process:

A process for the selective and stepwise separation of accompanying gases from a raw synthesis gas stream by a liquid absorbent countercurrently guided through all process steps and circulated via regeneration plants, wherein in one of the selective absorption steps chiefly $H_2S$ and COS are separated and in the next step in flow direction of the gas chiefly $CO_2$ is separated, and in the last step a separation of accompanying gas residues (fine wash) is effected, wherein before the separation of $H_2S$ and COS an absorption step chiefly for the separation of aromatics and subsequently an absorption step chiefly for the separation of methyl mercaptan is carried out.

In the first absorption step in flow direction of the gas chiefly aromatics, such as benzene, but also higher hydrocarbons, $NH_3$, HCN, thiophene, mercaptans and other components with high solubility are separated from the raw synthesis gas. The loaded absorbent, in most cases methanol, is washed with water, wherein a water-containing naphtha phase is formed which is discharged from the process for the further treatment. After the wash, the absorbent is liberated from dissolved gases by rectification of residual water and by pressure reduction and subsequently by heating. Since the separated gases also contain mercaptans, it may be expedient to supply the same to a sulfur recovery plant.

Preferred Aspects of the Invention

The preferred aspects of the invention described below refer both to a standard absorption process and to a selective absorption process, unless indicated otherwise in connection with the respective aspect.

A preferred aspect of an embodiment of the invention is that the contact between the raw synthesis gas and the absorbent is effected via packed beds and/or via structured packings. In this way, a good contact between the gas and the absorption liquid is given. The plant design with regard to the size of the packed bed or the packing and the appearance of the fillings and the process parameters can easily be adapted to the intended absorption task for each absorption stage.

Another preferred aspect of an embodiment of the invention is that as absorbent methanol is used. Methanol has a high and strongly temperature-dependent absorption capacity with respect to most accompanying gases of the synthesis gas. Due to the strong temperature dependence it can easily again be liberated from the gases by heating.

Another preferred aspect of an embodiment of the invention is that the absorption is carried out at a pressure between 20 and 40 bar. The pressure level of the synthesis gas production process hence is adopted, so that no particular pressure increase or pressure decrease must be carried out. In addition, by simple pressure reduction a part of the absorbed gas, in particular $CO_2$, can easily again be separated from the absorbent.

Another preferred aspect of an embodiment of the invention is that the separation of $CO_2$ in the regeneration plants is effected by lowering the pressure in the absorbent and/or by stripping with nitrogen. By stripping with nitrogen, residues of $CO_2$ also are removed from the absorbent, so that during the subsequent separation of the sulfur-containing components from the absorbent, these $CO_2$ residues are not mixed with these components and cannot impair processing of the same in a sulfur recovery plant. Another preferred aspect of the invention is characterized in that the separation of the mercaptans, the $H_2S$ and COS from the absorbent loaded in the step for the separation of mercaptan and in the step for the separation of $H_2S$ and COS is effected by hot regeneration. These sulfur-containing components are easily and effectively separated by heating the absorbent. In many cases, it is economically expedient to then supply the same to a sulfur recovery plant.

Another preferred aspect of an embodiment of the invention is that the absorbent loaded in the aromatics separation step is washed with water for regeneration, then liberated from gases by rectification with water and then by pressure reduction and subsequent heating. By the water wash, hydrocarbons in the form of a naphtha phase and also other accompanying components are separated from the absorbent, which otherwise would be enriched and prematurely render the absorbent useless.

Another preferred aspect of an embodiment of the invention is that the quantity of the absorbent used in the absorption step for the separation of aromatics is smaller than the quantity of the absorbent used in the absorption step for the separation of methyl mercaptan. In this way, only a small part of the methyl mercaptans together with the aromatics and higher hydrocarbons is separated, while the main quantity is separated in a separate step. As a result, the main quantity of the absorbent loaded with methyl mercaptans need not be subjected to the water wash.

Another preferred aspect of an embodiment of the invention is that the raw synthesis gas stream is obtained by fixed-bed pressure gasification of coal. In particular in the gasification of coal by the fixed-bed pressure gasification process said impurities, namely mercaptans such as methyl mercaptan, but also aromatics, appear in so significant concentrations that the application of the process according to the invention provides particular advantages.

In certain embodiments, the invention can also include a plant for carrying out the process according to the invention. In one embodiment, the plant for carrying out the first two absorption steps in flow direction of the gas can include a two-stage pre-scrubber or two spatially separate pre-washing stages. In flow direction of the gas, the first stage of the pre-scrubber or the first pre-washing stage is designed for chiefly separating the aromatics and the second stage is designed for chiefly separating the mercaptans, in particular methyl mercaptan.

BRIEF DESCRIPTION OF THE DRAWINGS

Further features, advantages and possible applications of the invention result from the subsequent description of the drawings and the exemplary embodiments. In this case, all described and/or pictorially presented features, alone or in any combination, are the subject matter of the invention, independently of the summary thereof in the claims and the dependency reference thereof.

The Figure shows a flow diagram of an exemplary aspect of the process according to the invention and the plant according to the invention

DETAILED DESCRIPTION OF THE INVENTION

Further features, advantages and possible applications of the invention can also be taken from the following description of an exemplary embodiment and the drawing. All features described and/or illustrated form the subject-matter of the invention per se or in any combination, independent of their inclusion in the claims or their back-reference.

With reference to the Figure, the invention will now be explained in detail. The plant represents an implementation of the selective absorption process and comprises the two-stage pre-scrubber 1 and the three-stage main scrubber 2 as main components. The washing and absorption stages each substantially consist of a packed bed which is irrigated with the absorbent methanol. In each of these stages an absorption step is carried out. Via conduit 3, raw synthesis gas is introduced into the pre-scrubber 2 via a cooler 4 with a temperature in the range from −5 to −30° C. and with a pressure in the range from 25 to 33 bar. The first stage 5 of the pre-scrubber 1 on the gas side is designed such and, by adjustment of the process parameters, in particular of the supplied absorbent mass flow 11, operated such that chiefly aromatics are absorbed from the gas. The second stage 6 on the gas side is designed for the separation of mercaptans. In the second stage 6 a partial stream 7 of the absorbent loaded in the main scrubber 2 is used as absorbent. After passing through the packed bed of the second stage 6, the methanol is collected at the column bottom 8. A partial stream 9 thereof is passed into the hot regeneration plant 10 and a partial stream 11 is guided through the first stage 5 for further loading and then, through conduit 12, into the regeneration plant 13. Here, the hydrocarbons first are extractively separated by means of water 14 and as naphtha product 15 supplied to a further, non-illustrated treatment. In a further step, water and absorbent then are separated by means of rectification. The separated water 16 is supplied to a waste water treatment, the regenerated absorbent is supplied to the hot regeneration plant 10 via conduit 17. The gases 18 obtained during the rectification in the regeneration plant 13 contain sulfur compounds and are supplied to a non-illustrated sulfur recovery plant.

The raw synthesis gas treated in the pre-scrubber 1 is passed into the main scrubber 2 via conduit 19. Here, the raw synthesis gas one after the other traverses the absorption stage 20 for the separation of $H_2S$ and COS, subsequently the absorption stage 21 for the separation of $CO_2$, and finally the absorption stage 22 for the fine wash.

The fine wash in stage 22 exclusively is carried out with absorbent treated in the hot regeneration plant 10, which is introduced into the stage 22 via conduit 23. The absorbent partly loaded in stage 22 subsequently is used for the $CO_2$ absorption in stage 21. The absorbent partly loaded in stage 21 is collected at the column bottom 24. From the column bottom 24 a partial stream is supplied to the further loading in stage 20 via conduit 25. The remaining part of the absorbent collected at the bottom 24 is charged into the regeneration plant 27 via conduit 26. Via conduit 28, $CO_2$ is separated there from the absorbent by depressurization and supplied to the further, non-illustrated treatment. Via conduit 29, a part of the absorbent regenerated in plant 27 is introduced into stage 21 for reloading, the other part is transferred into the regeneration plant 31 via conduit 30. A partial stream of the absorbent loaded in the three absorption stages of the main scrubber 2 likewise is introduced into the regeneration plant 31 via conduit 32 and, together with stream 30, is liberated there from $CO_2$ by depressurization, which $CO_2$ is discharged from the regeneration plant 31 as stream 33 for the further treatment. When particularly low $CO_2$ values are to be achieved in the absorbent, stripping of the absorbent for example with nitrogen additionally is carried out in plant 31. In the regeneration plant 31 sulfur-containing components, in particular $H_2S$ and COS, are not removed from the absorbent; this will only be done in the hot regeneration plant 10 into which the absorbent is transferred via conduit 34. The sulfur-containing gases, in particular $H_2S$, COS and mercaptans, are supplied to the further treatment, preferably in a non-illustrated sulfur recovery plant, as stream 35.

At the head of the main scrubber 2, the purified synthesis gas is discharged as stream 36 and supplied to the further use.

INDUSTRIAL APPLICABILITY

The invention provides an advantageous process which produces less environmental problems due to mercaptans and achieves a longer service life of the absorbent by separation of aromatics and higher hydrocarbons from the absorbent. The invention therefore is industrially applicable. These advantages are obtained in particular in the treatment of raw synthesis gas which has been produced by fixed-bed pressure gasification of coal.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 pre-scrubber
2 main scrubber
3 conduit for raw synthesis gas
4 cooler
5 first stage of the pre-scrubber
6 second stage of the pre-scrubber
7 partial stream of the absorbent loaded in the main scrubber
8 column bottom
9 partial stream absorbent
10 hot regeneration plant
11 partial stream absorbent
12 partial stream absorbent
13 regeneration plant
14 water
15 naphtha product
16 waste water
17 conduit for absorbent
18 sulfur-containing gases
19 raw synthesis gas after pre-wash 20 first absorption stage of main scrubber
21 second absorption stage of main scrubber
22 third absorption stage of main scrubber (fine wash)
23 absorbent
24 column bottom
25 partial stream absorbent
26 partial stream absorbent
27 regeneration plant
28 $CO_2$ stream
29 absorbent
30 absorbent
31 regeneration plant
32 absorbent
33 $CO_2$ stream, possibly also containing $N_2$
34 absorbent
35 sulfur-containing gases
36 purified synthesis gas

The invention claimed is:

1. A process for the stepwise separation of accompanying gases from a raw synthesis gas stream by a liquid absorbent countercurrently guided through all process steps and circulated via regeneration plants, the process comprising the steps of:
separating $H_2S$, COS and $CO_2$ in an absorption step; and
separating accompanying gas residues,
wherein before the separation of $H_2S$, COS and $CO_2$, the process further comprises an absorption step configured for the removal of aromatics followed by an absorption step configured for the separation of methyl mercaptan.

2. The process according to claim 1, wherein the contact between the raw synthesis gas and the absorbent is effected via packed beds and/or via structured packings.

3. The process according to claim 1, wherein methanol is used as absorbent.

4. The process according to claim 1, wherein the absorption is carried out at a pressure between 20 and 40 bar.

5. The process according to claim 1, wherein the separation of $CO_2$ in the regeneration plants is effected by lowering the pressure in the absorbent and/or by stripping with nitrogen.

6. The process according to claim 1, wherein the separation of the mercaptans, the $H_2S$ and COS from the absorbent loaded in the step for the separation of mercaptan and in the step for the separation of $H_2S$ and COS is effected by hot regeneration.

7. The process according to claim 1, wherein the absorbent loaded in the aromatics separation step is washed with water for regeneration, then liberated from gases by rectification with water and then by pressure reduction and subsequent heating.

8. The process according to claim 1, wherein the quantity of the absorbent used in the absorption step for the separation of aromatics is smaller than the quantity of the absorbent used in the absorption step for the separation of methyl mercaptan.

9. The process according to claim 1, wherein the raw synthesis gas stream is obtained by fixed-bed pressure gasification of coal.

10. A process for the selective and stepwise separation of accompanying gases from a raw synthesis gas stream by a liquid absorbent countercurrently guided through all process steps and circulated via regeneration plants, the process comprising the steps of:
removing $H_2S$ and COS from the raw synthesis gas in an absorption step followed by removal of CO2 in the next step in flow direction; and
separating of accompanying gas residues,
wherein before the separation of $H_2S$ and COS, the process further comprises an absorption step configured for the separation of aromatics and followed by an absorption step configured for the separation of methyl mercaptan.

11. The process according to claim 10, wherein the contact between the raw synthesis gas and the absorbent is effected via packed beds and/or via structured packings.

12. The process according to claim 10, wherein methanol is used as absorbent.

13. The process according to claim 10, wherein the absorption is carried out at a pressure between 20 and 40 bar.

14. The process according to claim 10, wherein the separation of $CO_2$ in the regeneration plants is effected by lowering the pressure in the absorbent and/or by stripping with nitrogen.

15. The process according to claim 10, wherein the separation of the mercaptans, the $H_2S$ and COS from the absorbent loaded in the step for the separation of mercaptan and in the step for the separation of $H_2S$ and COS is effected by hot regeneration.

16. The process according to claim 10, wherein the absorbent loaded in the aromatics separation step is washed with water for regeneration, then liberated from gases by rectification with water and then by pressure reduction and subsequent heating.

17. The process according to claim 10, wherein the quantity of the absorbent used in the absorption step for the separation of aromatics is smaller than the quantity of the absorbent used in the absorption step for the separation of methyl mercaptan.

18. The process according to claim 10, wherein the raw synthesis gas stream is obtained by fixed-bed pressure gasification of coal.

* * * * *